Jan. 29, 1935. M. WEISZ 1,989,437
MIRROR
Filed April 2, 1934
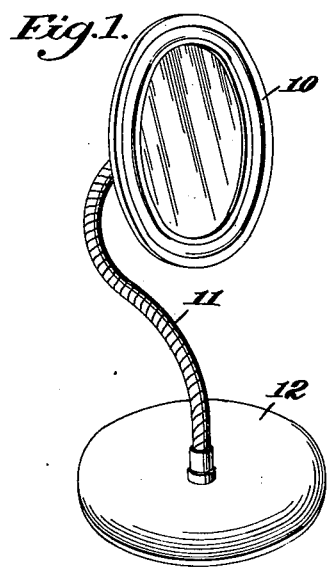
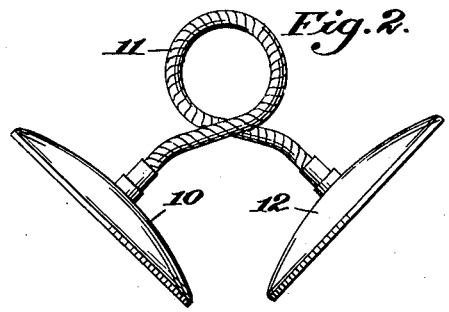
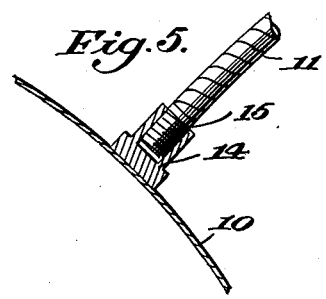
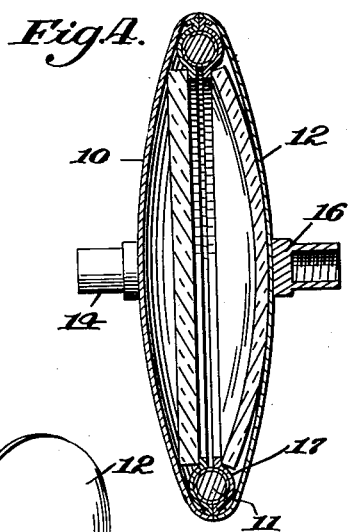
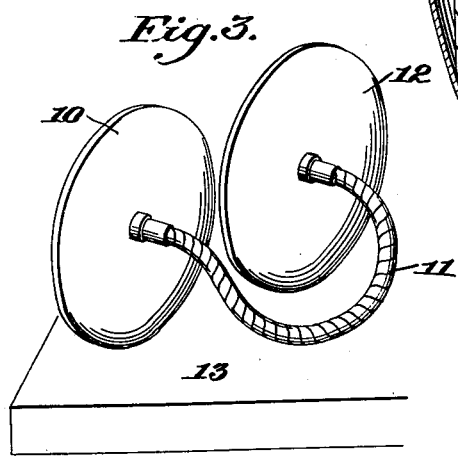
Inventor:
M. Weisz,
by Carl Finning
his Atty.

Patented Jan. 29, 1935

1,989,437

UNITED STATES PATENT OFFICE 1,989,437

MIRROR

Matthias Weisz, Vienna, Austria

Application April 2, 1934, Serial No. 718,709
In Austria April 13, 1933

4 Claims. (Cl. 45—99)

The invention relates to mirrors of the portable type.

In one aspect the invention contemplates a pair of mirrors connected together by means for holding them in positions adjustable relative to each other. The connecting means may be separable from the mirrors so that the elements of the combination may be separated and readily assembled for transportation or use. While the invention may be embodied in a single mirror it preferably comprises two mirrors of different characteristics. Thus one may be an ordinary flat mirror and the other may be a magnifying mirror and the arrangement may be such that either or both mirrors may be available for use.

The combination when in use may be supported entirely by the hand of the operator or may be supported from or on some stationary object.

In the accompanying drawing Figs. 1, 2 and 3 are perspective views showing different positions the apparatus may take for use. Fig. 4 is a transverse vertical section through the apparatus collapsed and assembled for transportation and Fig. 5 is a fragmentary section through a portion of a mirror casing showing one form of connection to the supporting means.

In Fig. 1 a mirror 10 is shown supported by a relatively stiff, self-sustaining flexible member 11 which in turn is supported from the second mirror 12 which may rest upon any suitable base. The flexible member 11 may preferably consist of a piece of flexible cable of a spiral formation. The mirrors are shown suitably mounted in casings which preferably have flat faces. While one mirror is shown concave for magnifying, both may be flat ordinary mirrors or the one used as a base in Fig. 1 may be merely a casing with the mirror omitted but this is not preferred. In Fig. 3 the mirrors 10 and 12 are shown resting upon a base 13 against which the flexible connecting member 11 lies so as to support both mirrors 10 and 12 for simultaneous or successive use. In Fig. 2 the connecting cable 11 is shown twisted or looped so that it may form a convenient handle for supporting the mirrors 10 and 12 in the hand of one who wishes to use them or the arrangement in Figs. 2 or 3 may be supported by passing the connecting member 11 over a hook or other supporting means. The supporting member 11 may be attached to the casings of the mirrors 10 and 12 by any suitable means. Its ends may fit into sockets in the casings for the mirrors 10 and 12 and may be held therein by any suitable means such as bayonet joints, threads or the like.

In Fig. 5 the back of the casing of the mirror 10 is shown as provided with a projecting socket 14 which is internally threaded to receive the threaded end 15 of the connecting member 11.

As illustrated in Fig. 4 a similar socket 16 may be provided on the casing of the mirror 12 to receive the other end of the connecting member 11.

As illustrated in Fig. 4, the cable 11 may be separated from both sockets 14 and 16 and may be laid between faces of the mirrors 10 and 12. When desired cooperating peripheral channels 17 may be provided in the faces of the mirrors to receive the cable. This is not essential, however, since the mirrors may be placed face to face as illustrated in Fig. 4 and the cable instead of being enclosed may be placed on the concave surface surrounding the projecting socket 14 or the projecting socket 16. For transportation, for travel or the like, the mirrors may be held in the collapsed face to face position by a suitable surrounding strap or by being placed in a more or less snugly-fitting bag although this forms no part of the present invention.

It will be noted that the mirrors have been illustrated as of the same size and this may be a convenient construction although the invention is not limited to this as the mirrors may be of different sizes and either the plain mirror or the magnifying mirror may be smaller than the other.

It will be noted that there is produced a construction by which the mirrors may be supported on substantially any base and in substantially any position and in such a way that either the plain mirror or the magnifying mirror may be available for observation and use or both mirrors may be available for observation and use at the same time. This is accomplished by simple efficient means. When desired the device may be decorated in any suitable manner and form a convenient attractive article for the toilet or any other use.

I claim as my invention:

1. Two mirrors, casings for each of the mirrors, seats on the casings, a flexible cable detachably engaging at its opposite ends the seats and capable of sustaining the weight of the mirrors and casings without deflecting.

2. Two mirrors, casings of substantially the same size for each of the mirrors, each casing having a flat face, a flexible cable detachably engaging at its opposite ends the respective casings so that when one mirror rests on a support on its flat face the other mirror will be held by the cable in any adjusted position.

3. A flexible cable, and a mirror at each end of the cable so that when the cable is supported the mirrors may be held at rest thereby in any adjusted position.

4. Two mirrors, and means for connecting the mirrors comprising a flexible cable allowing each mirror to be moved independently of the other.

MATTHIAS WEISZ.